(No Model.)
B. C. HINMAN.
PROCESS OF EXTRACTING GOLD FROM ORES.
No. 545,891.  Patented Sept. 10, 1895.
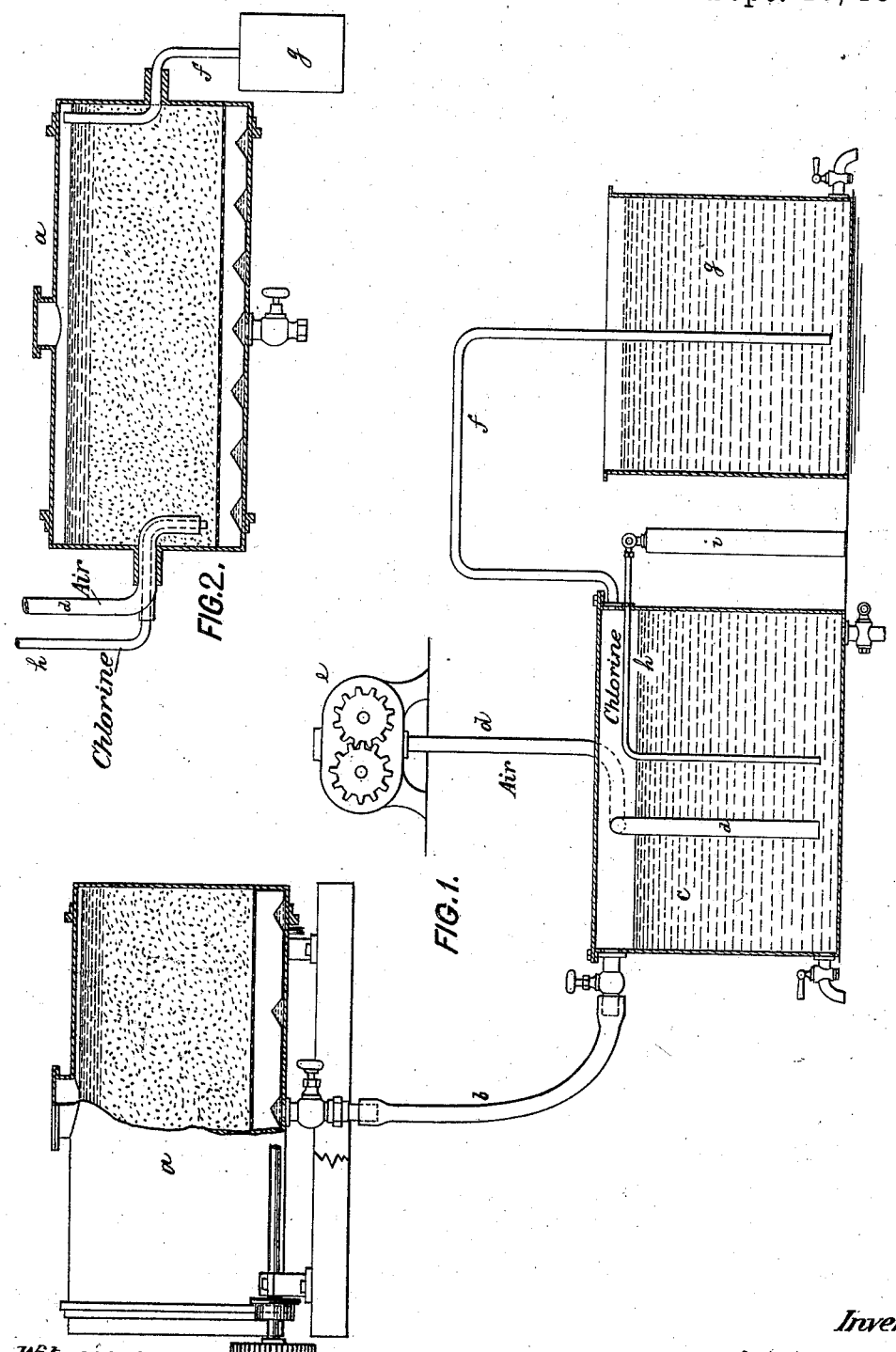
Witnesses:
John Becker
William Schulz
Inventor:
Bertrand C. Hinman
by his attorneys
Roeder & Briesen

UNITED STATES PATENT OFFICE.

BERTRAND C. HINMAN, OF BROOKLYN, NEW YORK, ASSIGNOR TO THE GOLD AND BROMINE SEPARATING COMPANY, OF WEST VIRGINIA.

PROCESS OF EXTRACTING GOLD FROM ORES.

SPECIFICATION forming part of Letters Patent No. 545,891, dated September 10, 1895.

Application filed January 25, 1895. Serial No. 536,210. (No specimens.)

*To all whom it may concern:*

Be it known that I, BERTRAND C. HINMAN, of Brooklyn, New York, have invented an Improved Process for Extracting Gold from Ores and other Auriferous Substances, of which the following is a specification.

In the extraction of gold from ores and other auriferous substances by bromine a larger quantity of bromine must be employed than is necessary to combine with the gold. There are always present in the ore many other elements which combine with the bromine, so that the use of an excess of this element becomes imperative to economically extract the gold. An excess of bromine attacks and dissolves the gold very quickly, and this is an important feature in the treatment of gold-bearing ores. Unless, therefore, means are provided to prevent the loss of the bromine and to regenerate it from its combinations the process would become too expensive, and therefore practically prohibitive.

The object of my invention is to extract the gold from ores by the use of an excess of bromine and to regenerate the bromine.

In the accompanying drawings, Figure 1 is an elevation, partly in section, of an apparatus for carrying my invention into effect. Fig. 2 is a similar view of a modification.

The pulverized ore is mixed with water and is thrown into a revolving cylinder $a$. I then add from three to twenty pounds of bromine to each ton of ore, or as much as may be necessary to speedily dissolve the gold. The cylinder is closed and is revolved for about one to two hours, when all the gold will be found in solution. After the ore has been thoroughly leached with water the solution containing the free and combined bromine and the bromide of gold is run through pipe $b$ into the separating-tank $c$. This tank is connected by pipe $d$ with an air-compressor $e$, from which compressed air is conducted into the tank. The compressed air will drive the free bromine out from the body of the solution in the form of vapors, which are carried off through a pipe $f$ into an absorbing-tank $g$. This tank contains alkalies or such other substances as are capable of absorbing and retaining the bromine. Within the tank $g$ the bromine combines with the alkali to form a concentrated solution of a bromide and bromate salt, from which the bromine may be regenerated. If other elements have been present in the ore with which the bromine has combined, the solution in tank $c$ will contain such of them as are soluble in water. To split up these combinations and to set the bromine free, I introduce chlorine into the solution through pipe $h$. The chlorine is shown to be drawn from a cylinder $i$; but it may of course be generated or introduced in a different manner. The chlorine may be introduced simultaneously with the compressed air and will displace the bromine from its combinations. The liberated bromine vapors are carried into the tank $g$ to combine with the absorbent therein contained, from which they may be regenerated. After all the bromine has been expelled the gold solution is run into a precipitating-tank and the gold is precipitated therefrom in the usual manner. If desired, the cylinder $a$ may be directly connected with the tank $g$ and with the air and chlorine pipes, Fig. 2. In this case the cylinder $a$ will itself constitute the separator and the tank $c$ may be dispensed with.

What I claim is—

1. The process of extracting gold from ores and other auriferous substances and regaining the solvent which consists in dissolving the gold by an excess of bromine, driving the free bromine in the form of vapors out of the body of the solution by the action of compressed air and into an alkaline solution to form a salt, and regenerating the bromine from such salt, substantially as specified.

2. The process of extracting gold from ores and other auriferous substances which consists in dissolving the gold by bromine, separating the free bromine from the solution by compressed air, adding chlorine to the solution, and subjecting the liberated bromine vapors to the action of an absorbent, substantially as specified.

BERTRAND C. HINMAN.

Witnesses:
F. V. BRIESEN,
WILLIAM SCHULZ.